United States Patent
Hirono et al.

(10) Patent No.: US 10,565,417 B2
(45) Date of Patent: Feb. 18, 2020

(54) OPTICAL INFORMATION READING APPARATUS AND OPTICAL INFORMATION READING METHOD

(71) Applicant: OPTOELECTRONICS CO., LTD., Saitama (JP)

(72) Inventors: Mitsuaki Hirono, Saitama (JP); Shuhei Itamoto, Saitama (JP)

(73) Assignee: OPTOELECTRONICS CO., LTD., Saitama (JP)

( * ) Notice: Subject to any disclaimer, the term of this patent is extended or adjusted under 35 U.S.C. 154(b) by 0 days.

(21) Appl. No.: 16/293,940

(22) Filed: Mar. 6, 2019

(65) Prior Publication Data
US 2019/0347460 A1 Nov. 14, 2019

(30) Foreign Application Priority Data
May 11, 2018 (JP) ................................ 2018-092388

(51) Int. Cl.
*G06K 7/14* (2006.01)

(52) U.S. Cl.
CPC ......... *G06K 7/1473* (2013.01); *G06K 7/1447* (2013.01); *G06K 7/1478* (2013.01)

(58) Field of Classification Search
None
See application file for complete search history.

(56) References Cited

U.S. PATENT DOCUMENTS

2004/0026508 A1 2/2004 Nakajima et al.

FOREIGN PATENT DOCUMENTS

JP 2004-054645 A 2/2004

OTHER PUBLICATIONS

Extended European Search Report for EP19160714.2 dated Sep. 9, 2019, 7 pages.

*Primary Examiner* — Kristy A Haupt
(74) *Attorney, Agent, or Firm* — Brundidge & Stanger, P.C.

(57) ABSTRACT

An optical code reading process and a reading stability determining process are performed while suppressing an increase in the cost of a transfer system and avoiding a decrease in work efficiency. CMOS performs imaging. Processor reads an optical code contained in image data taken by CMOS and outputs a signal upon success of reading of the optical code. Further, processor calculates a first contrast at the time of teaching and a second contrast at the time of reading success, and determines reading stability based on a decrease rate of the second contrast with respect to the first contrast.

7 Claims, 8 Drawing Sheets

|  | -30 | -25 | -20 | -15 | -10 | -5 | 0 | 5 | 10 | 15 | 20 | 25 | 30 |
|---|---|---|---|---|---|---|---|---|---|---|---|---|---|
| -20 | 24.9 | 32.2 | 39.5 | 45.1 | 47.9 | 49.9 | 51.3 | 50.8 | 48.6 | 45.4 | 41.7 | 37 | 31.6 |
| -15 | 30.5 | 38.2 | 46.2 | 52.3 | 54.5 | 56.3 | 57.2 | 57.3 | 55.5 | 52.1 | 48 | 42.5 | 36.9 |
| -10 | 36.2 | 44.8 | 52.8 | 57.4 | 60.3 | 62.9 | 62.5 | 62.1 | 60.3 | 57.5 | 53.8 | 47.9 | 42.2 |
| -5 | 41.1 | 49.4 | 57.5 | 62.6 | 65.2 | 66.6 | 67.5 | 66.6 | 65.5 | 63.1 | 58.7 | 53.4 | 46.4 |
| 0 | 44.9 | 53.2 | 60.4 | 65.9 | 68.7 | 69.5 | 70.7 | 70 | 69.2 | 68.1 | 63.8 | 57.8 | 50 |
| 5 | 47.6 | 55.3 | 63.2 | 67.5 | 70.6 | 72.2 | 73.3 | 73.7 | 73.3 | 70.9 | 67.4 | 60.7 | 52.1 |
| 10 | 48.3 | 56.6 | 64.9 | 69.9 | 73.2 | 75.5 | 76.8 | 76.6 | 75.9 | 74.3 | 68.8 | 62 | 52.9 |
| 15 | 48.2 | 55.9 | 64.7 | 70.2 | 74.4 | 78.5 | 79.8 | 79.3 | 78.6 | 75.7 | 70.4 | 61.1 | 53 |

FIG. 7

|  | -35 | -30 | -25 | -20 | -15 | -10 | -5 | 0 | 5 | 10 | 15 | 20 | 25 | 30 | 35 |
|---|---|---|---|---|---|---|---|---|---|---|---|---|---|---|---|
| -20 | 6.1 | 20.1 | 25.3 | 30.4 | 33.3 | 35.2 | 36.9 | 37.2 | 36.8 | 35.9 | 34.1 | 31.3 | 28.2 | 24.5 | 16 |
| -15 | 18.4 | 24.2 | 30.1 | 35.1 | 38 | 39.3 | 41.2 | 41 | 40.8 | 39.8 | 37.7 | 35.6 | 32.6 | 27.7 | 23.6 |
| -10 | 22.1 | 29 | 34.8 | 39.2 | 42.3 | 39.3 | 44.3 | 45 | 44.7 | 44.1 | 41.9 | 39.2 | 36 | 32.7 | 26.8 |
| -5 | 25.1 | 32.2 | 38 | 42.9 | 46 | 46.5 | 47.6 | 48.3 | 47.6 | 46.6 | 45.6 | 43.6 | 40 | 35.1 | 30.3 |
| 0 | 28.1 | 34.3 | 41 | 45.3 | 47.7 | 49.3 | 50.6 | 50.3 | 49.6 | 49.7 | 49.3 | 46.6 | 43.2 | 38.3 | 31.7 |
| 5 | 29.9 | 36.2 | 42.8 | 46.7 | 49.8 | 51.3 | 52.2 | 52.4 | 52.9 | 52.4 | 51.6 | 49.4 | 45.5 | 40.6 | 33.6 |
| 10 | 30.9 | 37.7 | 43.3 | 48.2 | 51.3 | 53 | 54.6 | 55.1 | 55.1 | 54.6 | 53.4 | 51.2 | 46.2 | 41.1 | 34.4 |
| 15 | 30.3 | 37.3 | 42.6 | 48.1 | 51.5 | 54.5 | 55.9 | 57.5 | 57.1 | 56.4 | 54.7 | 52.2 | 47.3 | 40.8 | 33.6 |
| 20 | 28.9 | 36.5 | 42.4 | 48 | 52.2 | 55 | 57.4 | 59.6 | 59.5 | 58.1 | 56.1 | 53.1 | 46.3 | 40.3 | 32.8 |

OPTICAL INFORMATION READING APPARATUS AND OPTICAL INFORMATION READING METHOD

CROSS REFERENCE TO RELATED APPLICATIONS

This application is entitled to and claims the benefit of Japanese Patent Application No. 2018-092388, filed on May 11, 2018, the disclosure of which including the specification, drawings and abstract is incorporated herein by reference in its entirety.

TECHNICAL FIELD

The present invention relates to an optical information reading apparatus and an optical information reading method that perform an optical code reading process and a stability determination process.

BACKGROUND ART

Today, in a wide range of fields of product management, position detection, and the like, one-dimensional codes, two-dimensional codes, and other optical codes written with information expressed by symbols having reflectance different from that of the periphery are used. The one-dimensional code, which is also referred to as bar code, linear code, or the like, can express information, such as alphanumeric characters, for example, a universal product code through its bars and spaces made using striations with different widths linearly arranged adjacent to each other. The two-dimensional code, which is also referred to as two-dimensional symbol or the like, is a symbol in which information are arranged vertically and horizontally so that high information density is achieved, thereby storing a larger amount of information than the one-dimensional code. Note that the QR code (registered trademark) is a type of two-dimensional code.

To read optical codes, such as one-dimensional codes or two-dimensional codes, a code scanner or other optical information reading apparatuses is used. Optical information reading apparatuses are widely used in different fields. For example, an optical information reading apparatus is attached to a movable body which is called a vehicle in a transfer system. In this case, the optical information reading apparatus moves with the vehicle and reads an optical code attached to a predetermined position (station), and upon success of reading, outputs code information to the processor of the vehicle. The code information acts as a trigger for vehicle's deceleration or stop.

In use of the optical information reading apparatus, the stability of reading the optical code decreases due to contamination on the code label, print quality deterioration, contamination on the reading window of the optical information reading apparatus, or the like. Conventionally, a process is performed for measuring reading stability and outputting predictive maintenance information (PMI) indicating reading stability (see PTL 1).

Since the optical information reading apparatus notifies the user of the fact that the reading stability is decreasing at the stage where the optical code is readable, the user can take a necessary countermeasure before the optical information reading apparatus can no longer read the optical code, thereby avoiding the situation where the optical code unintentionally becomes unreadable.

CITATION LIST

Patent Literature

PTL 1
Japanese Patent Application Laid-Open No. 2004-54645

SUMMARY OF INVENTION

Technical Problem

In recent years, more accurate determination of reading stability has been required.

The present invention, which has been made in view of this, provides an optical information reading apparatus and an optical information reading method in which a reading stability determining process can be performed accurately.

Solution to Problem

An optical information reading apparatus according to the present invention includes: an imaging section that performs imaging; and a control section that reads an optical code contained in image data taken by the imaging section and outputs a signal upon success of reading of the optical code, in which the control section: calculates a first contrast at the time of teaching and a second contrast at the time of reading success, and determines reading stability based on a decrease rate of the second contrast with respect to the first contrast.

An optical information reading method according to the present invention includes: performing imaging in an imaging section; reading an optical code contained in image data taken by the imaging section; outputting a signal upon success of reading of the optical code; calculating a first contrast at the time of teaching and a second contrast at the time of reading success; and determining reading stability based on a decrease rate of the second contrast with respect to the first contrast.

Advantageous Effects of Invention

According to the present invention, a reading stability determining process can be performed accurately.

DESCRIPTION OF EMBODIMENTS

Embodiments of the present invention will be described in detail below with reference to the drawings. Note that in each embodiment, a code scanner is used as one example of an optical information reading apparatus. In addition, in each embodiment, a code scanner is attached to a vehicle (not shown in the drawings) that runs along a path on the ceiling or the like of a factory to carry parts and the like, and is used to read an optical code attached to a predetermined position. A vehicle may be referred to as "shuttle", "car carriage", "travel cart", "movable body", or the like. Note that the vehicle is wirelessly connected to a host computer (not shown in the drawings) that controls the transfer system.

Embodiment 1

In Embodiment 1, code scanner 100 performs a process for reading a two-dimensional code and a reading stability determining process.

<Configuration of Code Scanner>

Figure 1:
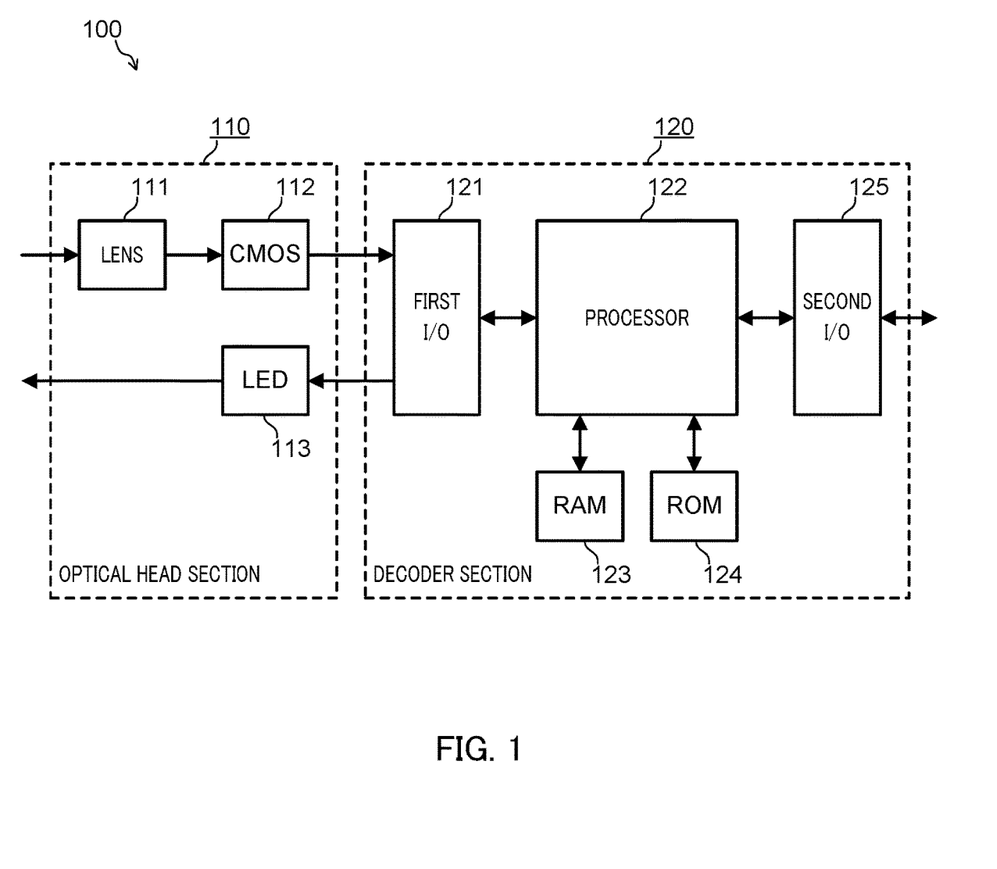
FIG. 1 is a diagram showing a schematic hardware configuration of a code scanner according to Embodiment 1 of the present invention.

First, the schematic hardware configuration of code scanner 100 of Embodiment 1 will be described with reference to FIG. 1. Code scanner 100 consists of optical head section 110 and decoder section 120.

Optical head section 110 includes lens 111 and complementary metal oxide semiconductor (CMOS) image sensor (hereinafter simply referred to as "CMOS") 112 which is one example of solid-state image sensing device. Optical head section 110 may further include light emitting diode (LED) 113 which is one example of light source.

Lens 111 is, for example, an optical lens which takes an image of an object to be read including an optical code into optical head section 110, and forms an image on the imaging area of CMOS 112.

CMOS 112 images the object to be read from light reflected off the object to be read taken by the lens 111, generates image data, which is expressed by a digital brightness, from the analog image signal obtained by imaging, and outputs it to decoder section 120.

LED 113 emits light to illuminate the object to be read. Hence, the CMOS 112 can pick up a clear image.

Decoder section 120 includes first input/output interface (first I/O) 121, processor 122, random access memory (RAM) 123, read only memory (ROM) 124, and second input/output interface (second I/O) 125.

First I/O 121 is an interface for data communication between optical head section 110 and decoder section 120 and image data output from CMOS 112 is input to processor 122 through first I/O 121.

Processor 122 controls CMOS 112 and LED 113 and performs a filtering process for removing noise in image data input from CMOS 112 through first I/O 121, a data processing process for preparation of decoding, a process for decoding an optical code contained in the processed image data, and the like. To be specific, the decoding process may use means described in Japanese Patent Application Laid-Open No. 2005-25417, for example, or other known arbitrary means.

Further, processor 122 determines reading stability. Subsequently, processor 122 outputs code information, which is the optical code reading result, and PMI, which represents the reading stability determination result, to the processor of the vehicle through second I/O 125.

RAM 123 is a storage means that temporarily stores image data input from CMOS 112, is used as a work memory during a data processing process for preparation for decoding, and stores other data needed for the operation of code scanner 100 or other data that dynamically changes. Note that a part of RAM 123 may be nonvolatile.

ROM 124 is a nonvolatile storage means that stores, for example, a program for actuating code scanner 100.

Second I/O 125 is an interface for data communication between processor 122 and the processor of the vehicle, and decoded data information output from processor 122 is input to the processor of the vehicle through second I/O 125.

<Process Flow in Code Scanner>

The flow of a process in processor 122 in code scanner 100 of Embodiment 1 will be described with reference to FIG. 2. Note that, in Embodiment 1, before the start of operation of a transfer system, at the time of teaching for making, for example, settings of thresholds related to a code scanner 100, a two-dimensional code reading process and calculation of contrast $C_T$ are performed.

Processor 122 is standby until the trigger signal is turned on or a reading start request is input (ST 101: NO). When the trigger signal is turned on or the reading start request is input (ST 101: YES), processor 122 turns on LED 113 (ST 102), retrieves image data input from CMOS 112 (ST 103), and turns off LED 113 (ST 104).

Subsequently, processor 122 binarizes the intensity of reflected light from the two-dimensional code contained in the retrieved image data, and decodes the binarized data and converts it to code information of several digits to several hundreds of digits, thereby decrypting the code information (ST 105). Note that, in this embodiment, the position of the code in image data may be contained in code information.

Processor 122 determines whether or not code information has been decrypted (ST 106). When the code information has been successfully decrypted (ST 106: YES), processor 122 outputs a completion notification signal indicating the completion of the reading process to the processor of the vehicle (ST 107).

After ST 107, processor 122 determines reading stability (ST 108), outputs predetermined data (code information, code position information, PMI, or the like) to the processor of the vehicle (ST 109), and terminates the process. The processor of the vehicle recognizes the position of the vehicle based on the code information, and controls the vehicle so that it decelerates and stops in a predetermined position, for example. In addition, code information and PMI are transferred from the vehicle to the host computer and are shown on the display of the host computer. Note that the details of the reading stability determining process will be described later.

When processor 122 has not successfully decrypted the code information upon the above-described determination in ST 106 (ST 106: NO), the flow proceeds to ST 110.

In ST 110, when the trigger signal is not off and the reading stop request is not input (ST 110: NO), the flow returns to ST 102. In contrast, when the trigger signal is turned off or a reading stop request is input (ST 110: YES), processor 122 outputs an abnormality notification signal indicating the fact that a process for reading the two-dimensional code has not been completed, that is, the occurrence of an abnormality to the processor of the vehicle (ST 111), and terminates the process. Upon reception of the abnormality notification signal, the processor of the vehicle controls the vehicle to bring it to an emergency stop, for example.

<Process Flow in Vehicle>

Figure 3:
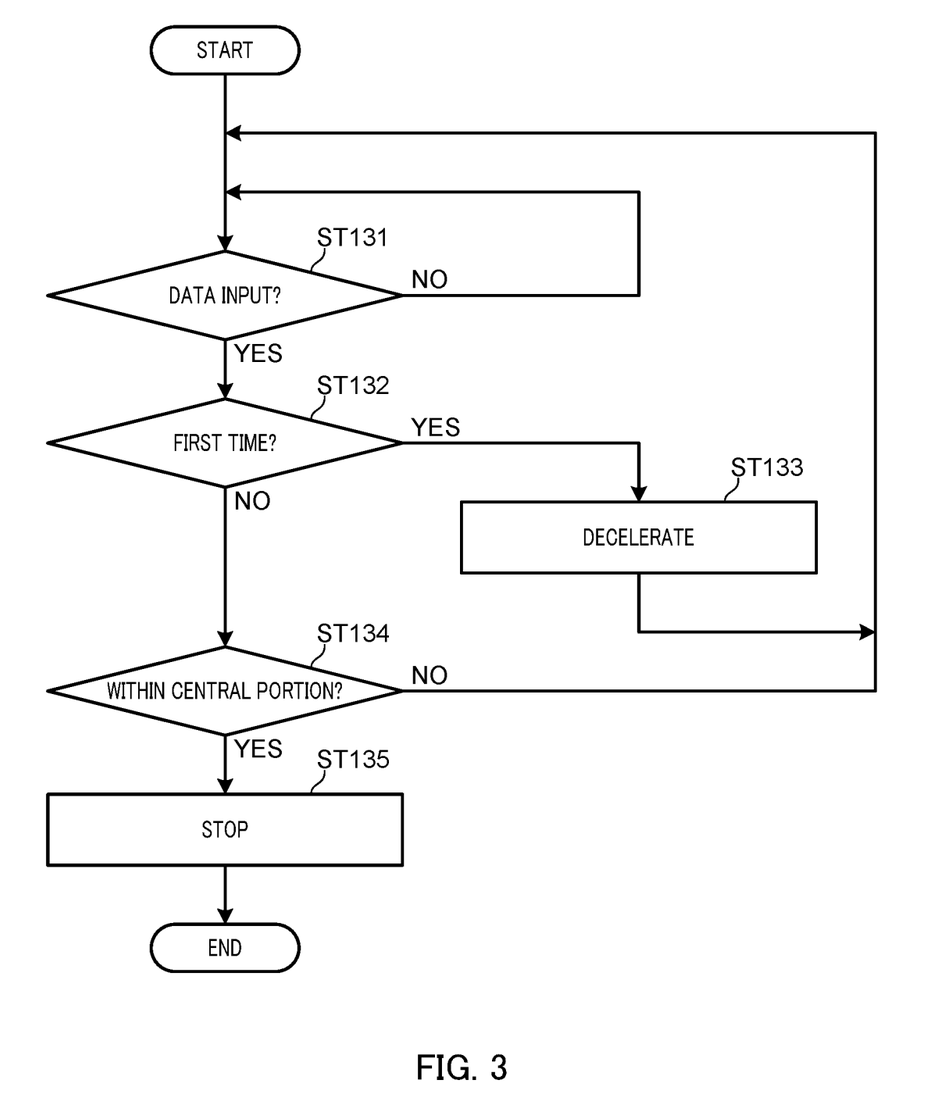
FIG. 3 is a flow diagram showing the flow of a process in a processor of a vehicle according to Embodiment 1 of the present invention.

The flow of a process in the processor of the vehicle mounted with code scanner 100 of Embodiment 1 will be described with reference to FIG. 3. Suppose that, in Embodiment 1, the vehicle is moving at high speed at the start point of the flow.

The processor of the vehicle is standby until input of predetermined data containing code information, code position information, and PMI from code scanner 100 (ST 131: NO). When the predetermined data is input (ST 131: YES) for the first time (ST 132: YES), the processor decelerates the vehicle (ST 133). The flow returns to ST 131.

In addition, when the predetermined data is input (ST 131: YES) not for the first time (ST 132: NO), the processor determines whether or not the two-dimensional code is located within the central portion of the screen (ST 134).

When the two-dimensional code is out of the central portion of the screen (ST 134: NO), the flow returns to ST 131. In contrast, when the two-dimensional code is located within the central portion of the screen (ST 134: YES), the vehicle is stopped (ST 135), and the process is terminated.

<Reading Stability Determining Process>

Figure 4:
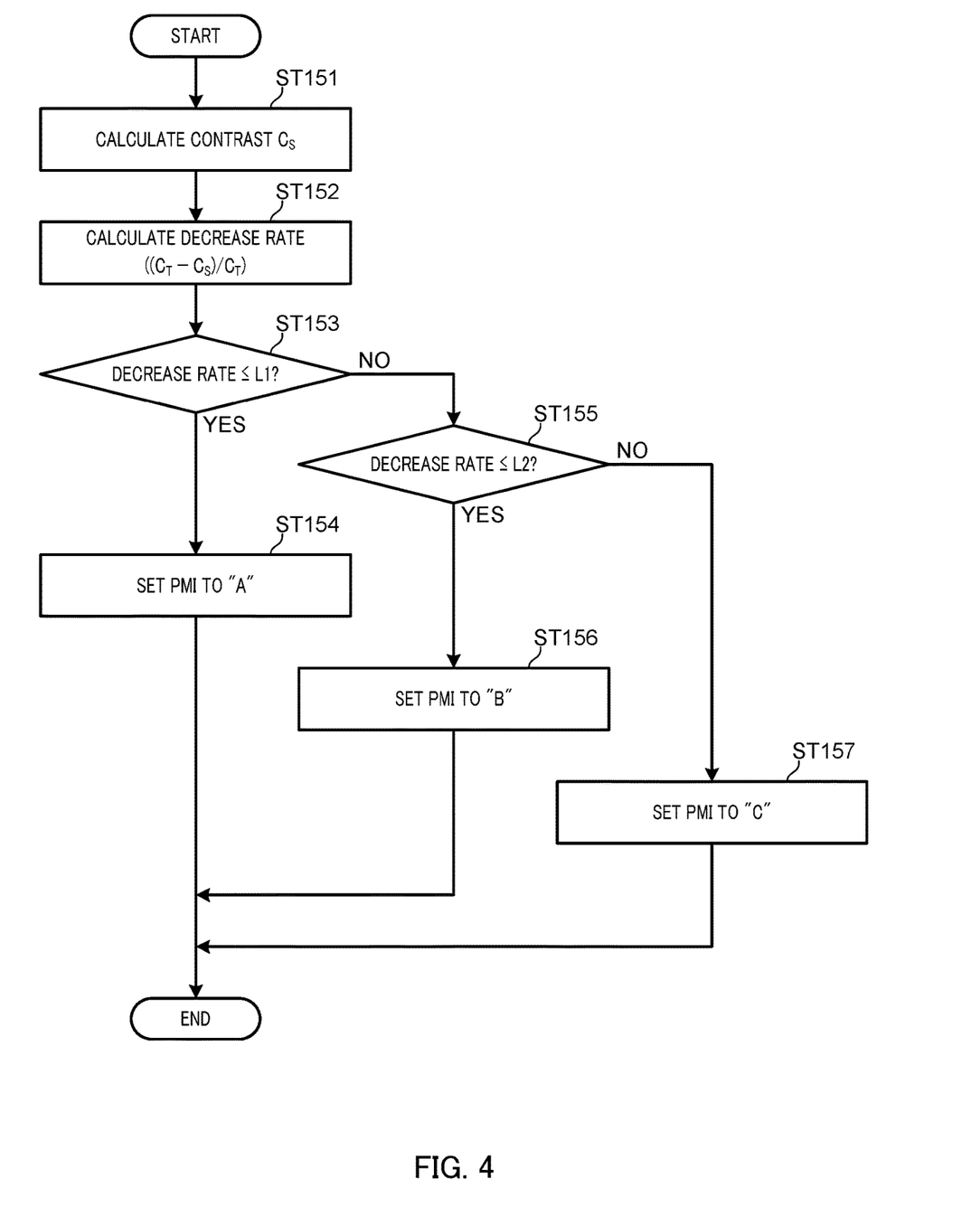
FIG. 4 is a flow diagram showing the flow of a reading stability determining process in the code scanner according to Embodiment 1 of the present invention.

Next, the details of the reading stability determining process of Embodiment 1 (ST 108 in FIG. 2) will be described with reference to FIG. 4. Note that in Embodiment 1, for RAM 124, caution threshold L1 and warning threshold L2 (L1<L2) are set in advance.

First, processor 122 calculates contrast CS of the two-dimensional code at a reading success (ST 151).

Next, processor 122 calculates a decrease rate $((C_T-C_S)/C_T)$ of contrast $C_S$ with respect to contrast $C_T$ calculated at the time of teaching (ST 152).

Next, processor 122 compares the decrease rate with caution threshold L1 and warning threshold L2 (ST 153 and ST 155).

When the decrease rate is less than or equal to caution threshold L1 (ST 153: YES), processor 122 determines that the reading stability is at a normal level and sets the simplified character of PMI to "A" (ST 154). In contrast, when the decrease rate is greater than caution threshold L1 (ST 153: NO) and less than or equal to warning threshold L2 (ST 155: YES), processor 122 determines that the reading stability is at a caution level and sets the simplified character of PMI to "B" (ST 156). When the decrease rate is greater than warning threshold L2 (ST 155: NO), processor 122 determines that the reading stability is at a warning level and sets the simplified character of PMI to "C" (ST 157).

Figure 2:
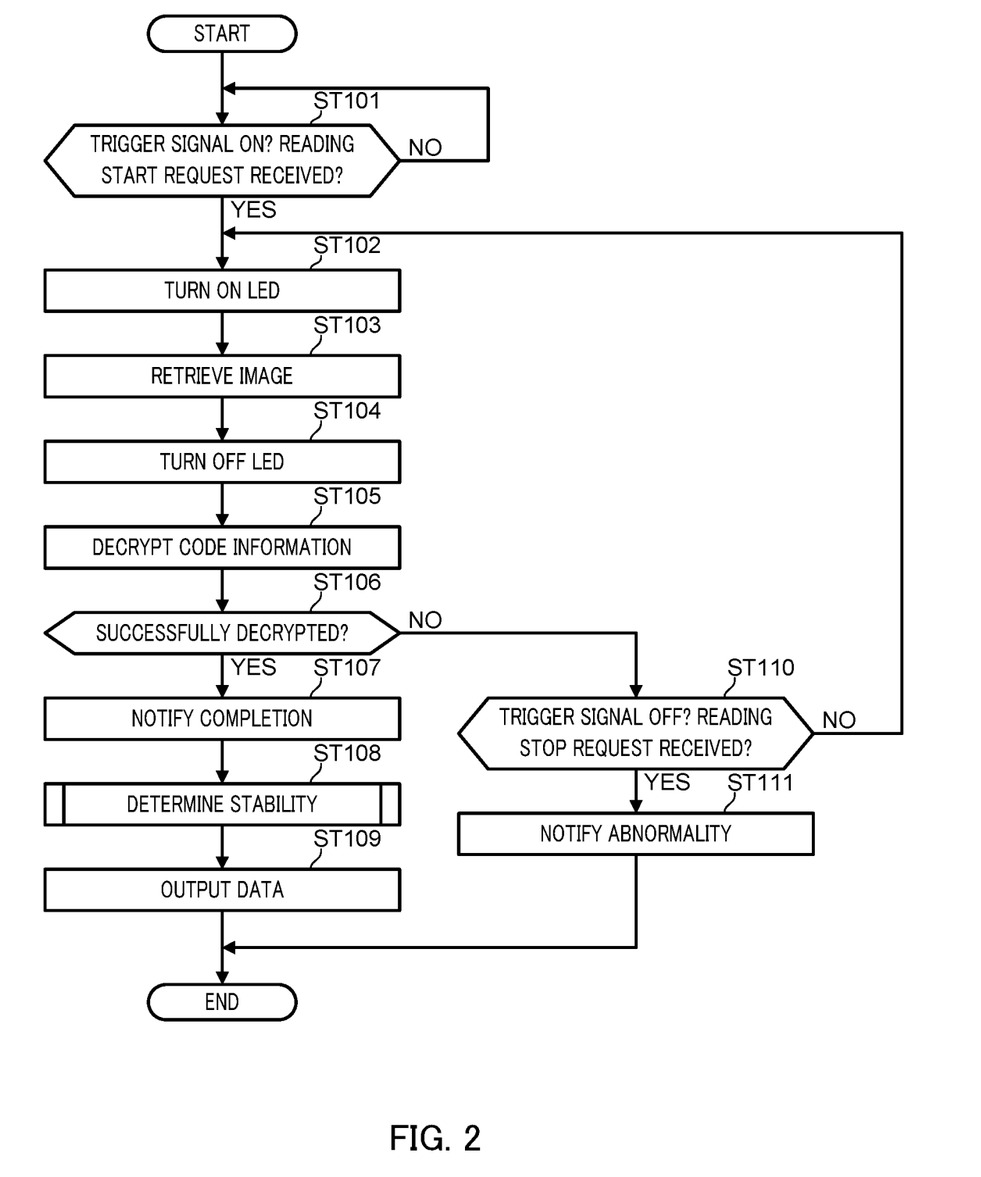
FIG. 2 is a flow diagram showing the flow of a process in a processor in the code scanner according to Embodiment 1 of the present invention.

After processor 122 makes determination related to reading stability, in ST 109 in FIG. 2, code information, which is a reading result related to the two-dimensional code, and PMI, which is a determination result related to reading stability, are output to the processor of the vehicle.

Although the above description has been made assuming that PMI is a simplified character, this is not necessarily the case in Embodiment 1: for example, a decrease rate $((C_T-C_S)/C_T)$ may be used as PMI. In this case, the necessity of the above-described process from ST 153 to ST 157 in FIG. 4 is eliminated.

Further, although reading of a two-dimensional code has been described above as an example, Embodiment 1 is applicable to reading of one-dimensional codes.

<Example Processes in Code Scanner and Vehicle>

Example processes in code scanner 100 and a vehicle according to Embodiment 1 will be described with reference to FIG. 5. Note that, in this example, the X coordinate of a point within a central portion is "greater than or equal to 250 and less than 350".

Figure 5:
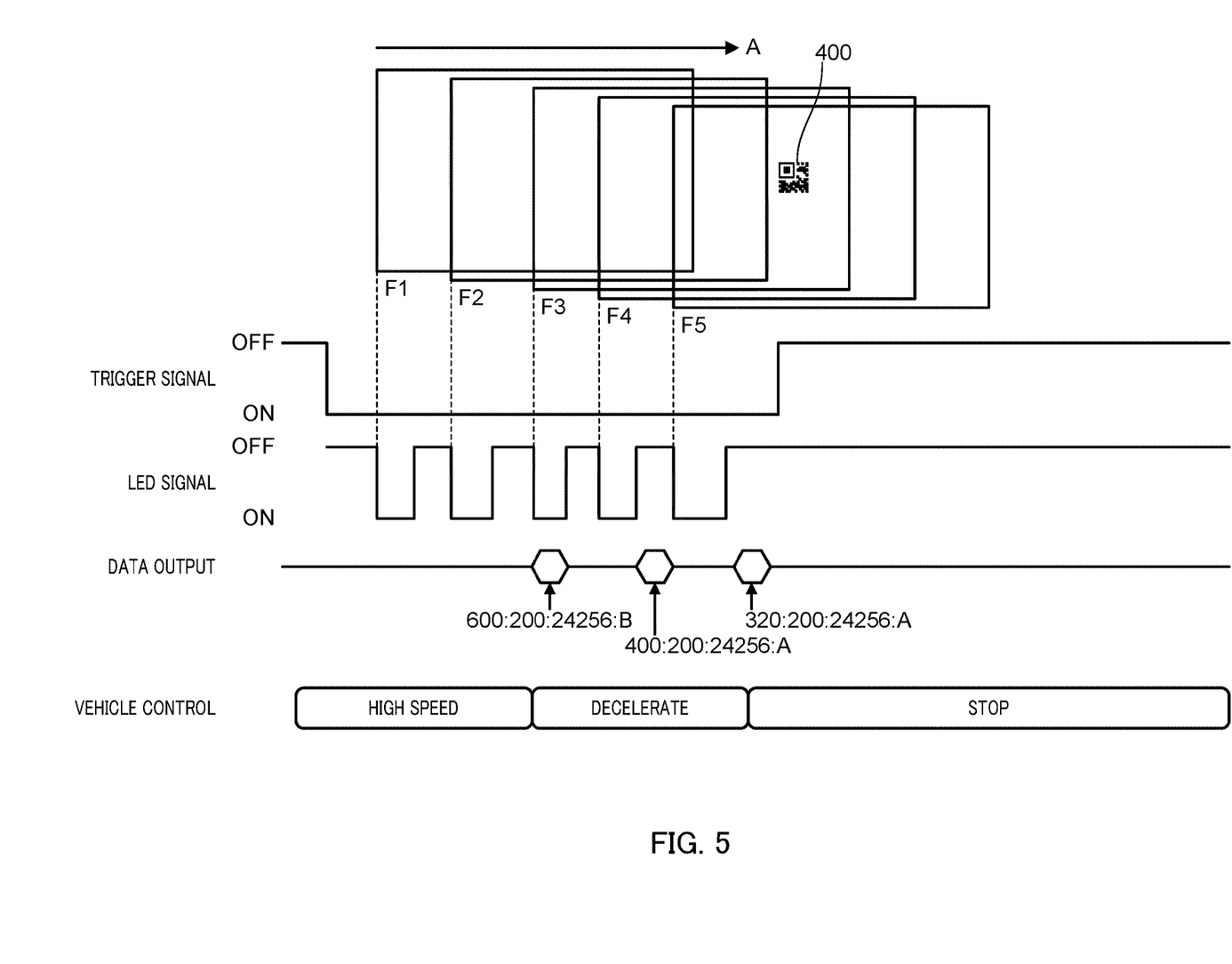
FIG. 5 is a diagram for explaining a concrete example of a process in the code scanner according to Embodiment 1 of the present invention.

Code scanner 100 attached to the vehicle moves along the movement of the vehicle (the direction of A in FIG. 5).

Referring to FIG. 5, suppose that the trigger signal is turned on at time $t_{TR}$. Subsequently, at time $t_j$ (j is an integer of one or more), code scanner 100 turns on LED 113, repeats to attempt a process for reading two-dimensional code 400, and determines a success or failure of reading two-dimensional code 400 each time.

In FIG. 5, two-dimensional code 400 does not exist in screen F1 at time $t_1$ and screen F2 at time $t_2$, and code scanner 100 therefore determines that code information has been not decrypted (ST 106: NO in FIG. 2). In this case, data is not output from code scanner 100 to the vehicle, the processor of the vehicle does not perform speed control (ST 131: NO in FIG. 3). Consequently, the high speed of the vehicle is maintained.

Subsequently, two-dimensional code 400 appears for the first time in screen F3 at time $t_3$, and code scanner 100 determines that a success of reading two-dimensional code 400 has been achieved. In other words, time $t_3$ corresponds to the time of the first reading success. In this case, code scanner 100 performs a reading stability determining process (ST 108 in FIG. 2), and outputs data including code information, code position information, PMI, and the like to the vehicle (ST 109 in FIG. 2). In FIG. 5, code position information is "(X, Y)=(600, 200)", code information is "24256", and PMI is "B". Since this is the first data input, the processor of the vehicle decelerates the vehicle (ST 132: YES and ST 133 in FIG. 3).

Further, two-dimensional code 400 appears in screen F4 at time $t_4$, and code scanner 100 determines that a success of reading two-dimensional code 400 has been achieved. In this case also, code scanner 100 performs a reading stability determining process and outputs data to the vehicle. In FIG. 5, code position information is "(X, Y)=(400, 200)", code information is "24256", and PMI is "A". Since this is not the first data input, the processor of the vehicle determines whether or not the two-dimensional code is located within the central portion of the screen (ST 134 of FIG. 3).

In screen F4, the two-dimensional code is out of the central portion of the screen (ST 134: NO in FIG. 3), the processor of the vehicle does not perform additional speed control. Consequently, the deceleration of the vehicle is maintained.

Further, two-dimensional code 400 appears in screen F5 at time $t_5$, and code scanner 100 determines that a success of reading two-dimensional code 400 has been achieved. In this case also, code scanner 100 performs a reading stability determining process and outputs data to the vehicle. In FIG. 5, code position information is "(X, Y)=(320, 200)", code information is "24256", and PMI is "A". Since this is not the first data input, the processor of the vehicle determines whether or not the two-dimensional code is located within the central portion of the screen.

In screen F5, the two-dimensional code is within the central portion of the screen (ST 134: YES in FIG. 3), the processor of the vehicle brings the vehicle to a stop (ST 134: YES, ST 135 in FIG. 3).

<Effects>

As described above, in Embodiment 1, reading stability is determined based on a decrease rate (relative evaluation) of contrast at the time of teaching and reading success. Hence, determination can be made considering the environment in which reading is performed, so that stability can be determined more accurately than with evaluation (absolute evaluation) based on a comparison between fixed thresholds and the contrast at the time of reading success.

<Variation 1>

The brightness of image data varies depending on the position of the screen and decreases toward the end. For example, in FIG. 6, the brightness of the center of the screen (x=0, y=0) is "70.7", while the brightness of the upper left corner of the screen (x=−30, y=−20) is "24.9". For this reason, the larger the gap between the position of an optical code at the time of teaching and the position of the optical code at the time of reading success, the lower the accuracy of the contrast decrease rate.

Figure 6:
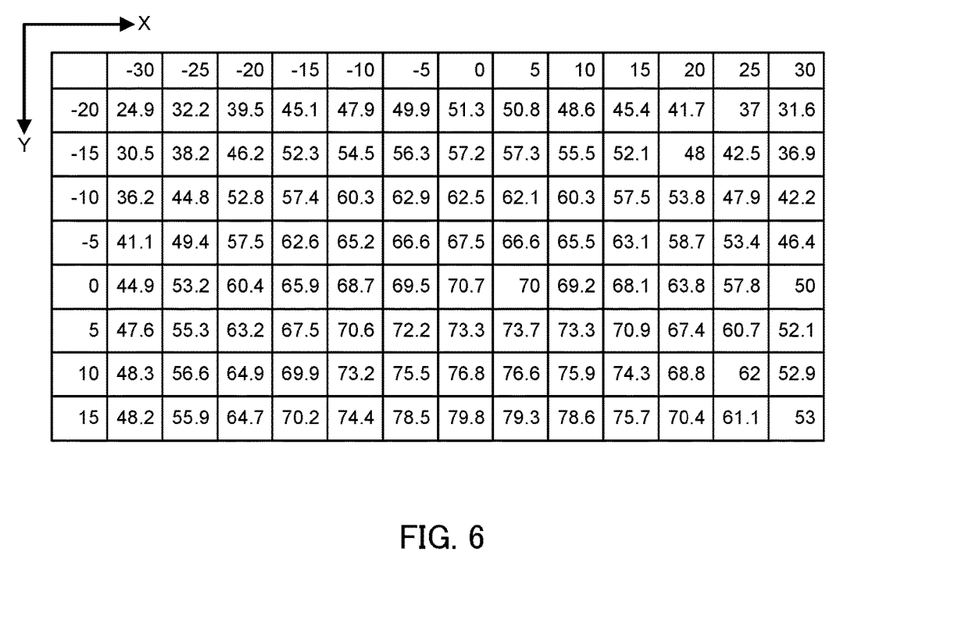
FIG. 6 is a diagram for explaining the fact that brightness related to image data changes depending on the position of the screen.

In view of this, in Variation 1 of Embodiment 1, code scanner 100 may correct contrast $C_T$ calculated at the time of teaching on the basis of the difference between the positions of the optical code in the image data at the time of teaching and the time of reading success, and calculate a decrease rate $((C_T-C_S)/C_T)$ of contrast $C_S$ with respect to contrast $C_T$ obtained by the correction.

Consequently, a variation in brightness dependent on the position of the screen can be corrected, thereby improving the accuracy of determining reading stability.

<Variation 2>

Figure 7:
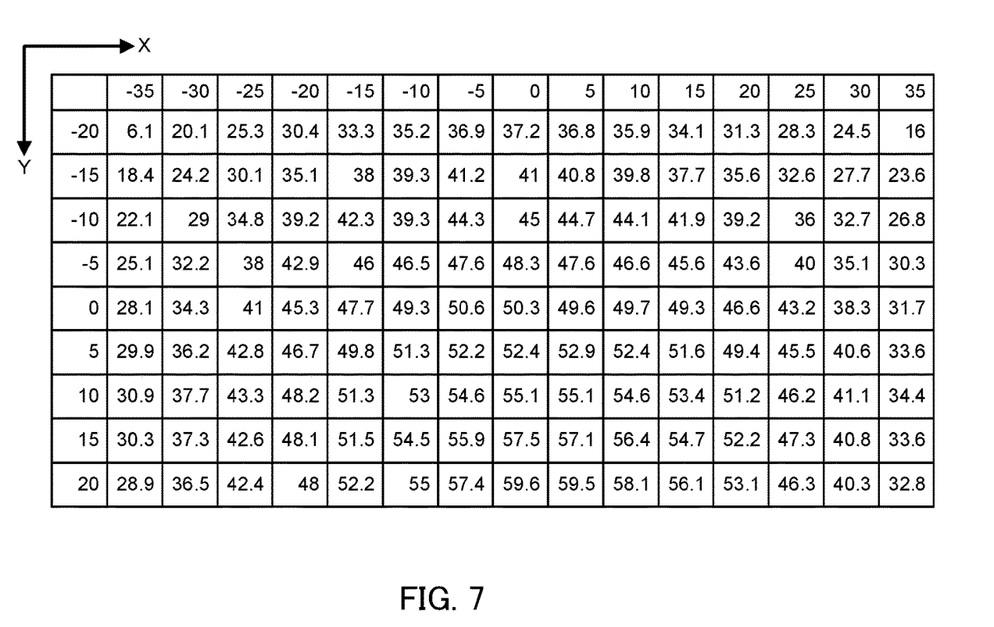
FIG. 7 is a diagram for explaining the fact that brightness related to image data changes depending on the distance (depth)

In addition, the brightness of image data, such as an optical code, also varies depending on the distance (depth) between code scanner 100 and the optical code, that is, the size of the optical code in the screen. For example, the brightness of the center (x=0, y=0) of the screen in FIG. 6 (with a depth of 101 mm) is "70.7", while the brightness of the center (x=0, y=0) of the screen in FIG. 7 (with a depth of 111 mm) is "50.3". For this reason, the larger the gap between the size of an optical code at the time of teaching and the size of the optical code at the time of reading success, the lower the accuracy of the contrast decrease rate.

In view of this, in Variation 2 of Embodiment 1, code scanner 100 may correct contrast $C_T$ calculated at the time of teaching on the basis of the difference between the sizes of the optical code in the image data at the time of teaching and the time of reading success, and calculate a decrease rate $((C_T-C_S)/C_T)$ of contrast $C_S$ with respect to contrast $C_T$ obtained by the correction.

Consequently, a variation in brightness dependent on the distance (depth) of the screen can be corrected, thereby improving the accuracy of determining reading stability. Note that a laser telemeter may be used to measure depths.

Embodiment 2

In Embodiment 2, a reading stability determining process different from that described in Embodiment 1 will be described. Note that the configuration and process flow of code scanner 100 in Embodiment 2 are the same as those in Embodiment 1 and their description will therefore be omitted.

Two-dimensional codes are subjected to error correction processing, such as Reed-Solomon coding, at the time of code patterning so that they are readable even if a portion of the cell patterns of the code is damaged. Hence, code scanner 100 can read all code information even if a portion of the two-dimensional code is damaged. At this time, code scanner 100 can recognize the number of erroneous cell patterns so that error correction can be performed. For this reason, in Embodiment 2, a reading stability determining process is performed based on the correction level.

<Reading Stability Determining Process>

Figure 8:
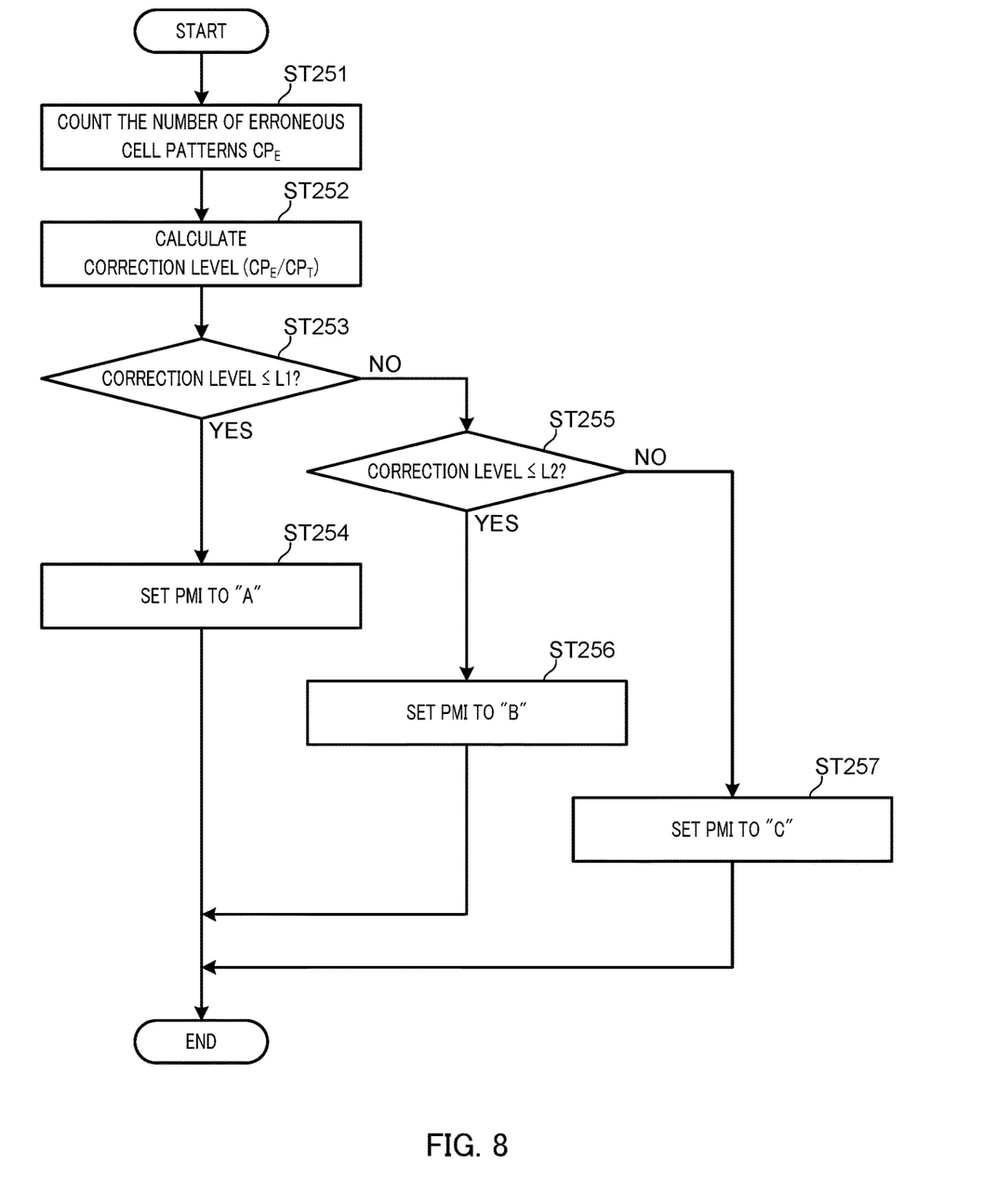
FIG. 8 is a flow diagram showing the flow of a reading stability determining process in a code scanner according to Embodiment 2 of the present invention.

The details of the reading stability determining process of Embodiment 2 will be described with reference to FIG. 8. Note that in Embodiment 2, for RAM 124, caution threshold L1 and warning threshold L2 (L1<L2) are set in advance.

First, processor 122 counts the number of erroneous cell patterns $CP_E$ (ST 251).

Next, processor 122 calculates a correction level ($CP_E/CP_T$) which is the ratio of the number of erroneous cell patterns $CP_E$ to the maximum number of correctable cell patterns $CP_T$ related to the two-dimensional code (ST 252). Note that $CP_T$ may be the total number of cell patterns.

Subsequently, processor 122 compares the correction level with caution threshold L1 and warning threshold L2 (ST 253 and ST 255).

When the correction level is less than or equal to caution threshold L1 (ST 253: YES), processor 122 determines that the reading stability is at a normal level and sets the simplified character of PMI to "A" (ST 254). In contrast, when the correction level is greater than caution threshold L1 (ST 253: NO) and less than or equal to warning threshold L2 (ST 255: YES), processor 122 determines that the reading stability is at a caution level and sets the simplified character of PMI to "B" (ST 256). When the correction level is greater than warning threshold L2 (ST 255: NO), processor 122 determines that the reading stability is at a warning level and sets the simplified character of PMI to "C" (ST 257).

Although the above description has been made assuming that PMI is a simplified character, this is not necessarily the case in Embodiment 2: for example, a correction level ($CP_E/CP_T$) may be used as PMI. In this case, the necessity of the above-described process from ST 253 to ST 257 in FIG. 8 is eliminated.

<Effects>

As described above, in Embodiment 2, reading stability is determined depending on the correction level of the two-dimensional code. Hence, reading stability can be determined based on the evaluation of the entire pattern of the two-dimensional code, so that stability can be determined more accurately.

Embodiment 3

In Embodiment 3, a reading stability determining process that is different from that described in Embodiment 1 will be described. Note that the configuration and process flow of code scanner 100 in Embodiment 3 are the same as those in Embodiment 1 and their description will therefore be omitted.

Even if a portion of binarized data of the two-dimensional code is erroneous, code scanner 100 can decode the binarized data to obtain correct code information. Further, code scanner 100 converts the obtained code information back to binarized data and can recognize the number of erroneous dots through binarization determination. In view of this, in Embodiment 3, a reading stability determining process is performed based on the number of erroneous dots recognized through binarization determination.

<Reading Stability Determining Process>

Figure 9:
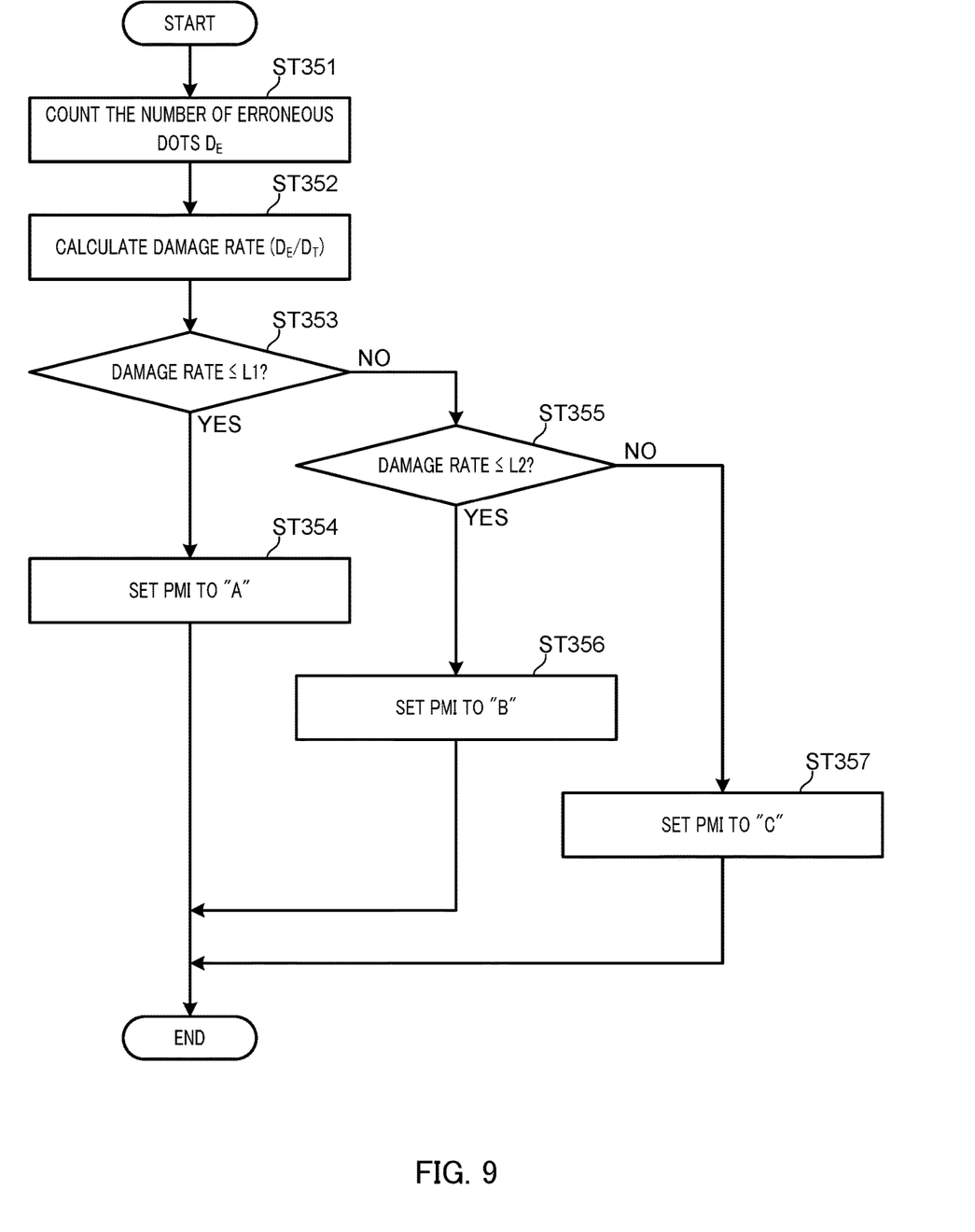
FIG. 9 is a flow diagram showing the flow of a reading stability determining process in a code scanner according to Embodiment 3 of the present invention.

The details of the reading stability determining process of Embodiment 3 will be described with reference to FIG. 9.

Note that in Embodiment 3, for RAM 124, caution threshold L1 and warning threshold L2 (L1<L2) are set in advance.

First, processor 122 counts the number of erroneous dots $D_E$ through binarization determination (ST 351).

Next, processor 122 calculates a damage rate ($D_E/D_T$) which is the ratio of the number of erroneous dots $D_E$ counted through binarization determination to the total number of dots $D_T$ of the two-dimensional code (ST 352).

Next, processor 122 compares the damage rate with caution threshold L1 and warning threshold L2 (ST 353 and ST 355).

When the damage rate is less than or equal to caution threshold L1 (ST 353: YES), processor 122 determines that the reading stability is at a normal level and sets the simplified character of PMI to "A" (ST 354). In contrast, when the damage rate is greater than caution threshold L1 (ST 353: NO) and less than or equal to warning threshold L2 (ST 355: YES), processor 122 determines that the reading stability is at a caution level and sets the simplified character of PMI to "B" (ST 356). When the damage rate is greater than warning threshold L2 (ST 355: NO), processor 122 determines that the reading stability is at a warning level and sets the simplified character of PMI to "C" (ST 357).

Although the above description has been made assuming that PMI is a simplified character, this is not necessarily the case in Embodiment 3: for example, a damage rate ($D_E/D_T$) may be used as PMI. In this case, the necessity of the above-described process from ST 353 to ST 357 in FIG. 9 is eliminated.

Further, although the above description has been made assuming that a two-dimensional code is read, Embodiment 3 is also applicable to reading of a one-dimensional code.

<Effects>

As described above, in Embodiment 3, reading stability is determined depending on the damage rate of the optical code. Hence, reading stability can be determined based on the evaluation of the entire pattern of the optical code, so that stability can be determined more accurately.

The above-described reading stability determining processes of Embodiments 1 to 3 are performed independently of each other. In the present invention, two or more of them may be used in combination to determine reading stability. In this case, the reliability of reading stability can be enhanced.

For example, when resultant reading stability determined based on the contrast described in Embodiment 1 is at a normal level, and resultant reading stability determined based on the correction level described in Embodiment 2 is at a caution level, processor 122 determines the caution level which is the worst result among determination results to be the final reading stability and sets the simplified character of PMI to "B".

Although a code scanner is used as an optical information reading apparatus in each embodiment, the present invention is applicable to the cases where other optical information reading apparatuses are used.

Further, although description has been made in the above-described embodiments assuming that reading stability is evaluated in three steps according to the magnitude relationship with two thresholds, this is not necessarily the case in the present invention: reading stability may be evaluated in two steps or four or more steps.

Further, in the above-described embodiments, the optical information reading apparatus may determine reading stability related to a plurality of optical codes, and when reading stability related to all the optical codes are decreased, determine that optical information reading apparatus itself has deteriorated, and transmit a signal for notifying warning to the host computer through the vehicle.

Further, in the above-described embodiments, the host computer may collect PMI from the optical information reading apparatus of each vehicle, and when a plurality of pieces of PMI for one optical code is at a caution level or warning level, determine that the optical code has deteriorated, and may issue a warning and notify the position of that optical code to the administrator.

Further, in the above-described embodiments, the host computer may collect a plurality of pieces of PMI for one optical code from the optical information reading apparatus of one vehicle, and when the percentage of caution level or warning level is greater than or equal to a predetermined value, determine that the optical code has deteriorated, and may issue a warning and notify the position of that optical code to the administrator.

INDUSTRIAL APPLICABILITY

The present invention is suitable for use in an optical information reading apparatus and an optical information reading method that perform an optical code reading process and a stability determination process.

REFERENCE SIGNS LIST

100 Code scanner
110 Optical head section
111 Lens
112 CMOS
113 LED
120 Decoder section
121 First I/O
122 Processor
123 RAM
124 ROM
125 Second I/O

What is claimed is:

1. An optical information reading apparatus, comprising:
   an imaging section that performs imaging; and
   a control section that reads an optical code contained in image data taken by the imaging section and outputs a signal upon success of reading of the optical code,
   wherein the control section:
     calculates a first contrast at the time of teaching and a second contrast at the time of reading success, and
     determines reading stability based on a decrease rate of the second contrast with respect to the first contrast.

2. The optical information reading apparatus according to claim 1, wherein the control section corrects the first contrast according to a difference between the positions of the optical code on a screen at the time of the teaching and the time of the reading success.

3. The optical information reading apparatus according to claim 1, wherein the control section corrects the first contrast according to a difference between the sizes of the optical code on a screen at the time of the teaching and the time of the reading success.

4. The optical information reading apparatus according to claim 1, wherein
   the optical code is an error-correction processed two-dimensional code, and
   wherein the control section:
     counts the number of error corrected cell patterns, calculates a correction level that is a ratio of the number of error corrected cell patterns to the total number of cell patterns, determines reading stability on the basis of the correction level, and determines final reading stability on the basis of the reading stability based on the decrease rate and the reading stability based on the correction level.

5. The optical information reading apparatus according to claim 1, wherein the control section counts the number of erroneous dots through binarization determination, calculates a damage rate that is a ratio of the number of erroneous dots counted through binarization determination to the total number of dots of the optical code, determines reading stability on the basis of the damage rate, and determines final reading stability on the basis of the reading stability based on the decrease rate and the reading stability based on the damage rate.

6. An optical information reading apparatus, comprising:

an imaging section that performs imaging to obtain image data; and a control section that decodes binarized data of an optical code contained in the image data taken by the imaging section to obtain code information and outputs a signal upon success of reading of the optical code, wherein the control section:

converts the code information back to binarized data of the optical code, counts the number of erroneous dots through binarization determination by comparing the binarized data of the optical code contained in the image data and the binarized data of the optical code obtained by converting the code information, calculates a damage rate that is a ratio of the number of erroneous dots counted through binarization determination to the total number of dots of the entire optical code, and determines reading stability on the basis of the damage rate.

7. An optical information reading method, comprising:

performing imaging in an imaging section;

reading an optical code contained in image data taken by the imaging section;

outputting a signal upon success of reading of the optical code;

calculating a first contrast at the time of teaching and a second contrast at the time of reading success; and determining reading stability based on a decrease rate of the second contrast with respect to the first contrast.

* * * * *